United States Patent [19]

McClain

[11] Patent Number: 4,942,605
[45] Date of Patent: * Jul. 17, 1990

[54] SECURITY HANDSET

[75] Inventor: Donald T. McClain, Richardson, Tex.

[73] Assignee: Northern Telecom Limited, Montreal, Canada

[*] Notice: The portion of the term of this patent subsequent to Jun. 6, 2006 has been disclaimed.

[21] Appl. No.: 264,992

[22] Filed: Oct. 28, 1988

Related U.S. Application Data

[63] Continuation-in-part of Ser. No. 130,190, Dec. 8, 1987, Pat. No. 4,837,819.

[51] Int. Cl.$^5$ ............................................. H04M 1/19
[52] U.S. Cl. ..................................... 379/424; 379/433
[58] Field of Search ..................... 379/21, 7, 387, 393, 379/421, 422, 423, 424, 433, 439, 441, 442, 451

[56] References Cited

U.S. PATENT DOCUMENTS

| | | | |
|---|---|---|---|
| 2,485,574 | 10/1949 | Deakin | 379/433 X |
| 3,627,930 | 12/1971 | Tolman | 379/433 X |
| 3,715,514 | 2/1973 | Bell, Jr. | 379/442 |
| 3,977,737 | 12/1976 | Watkins | 379/396 X |
| 4,504,701 | 3/1985 | Lucchesi | 379/424 X |
| 4,675,901 | 6/1987 | Smith et al. | 379/387 |
| 4,691,336 | 9/1987 | Durston | 379/21 |
| 4,837,819 | 6/1989 | McClain | 379/424 |

Primary Examiner—Jin F. Ng
Assistant Examiner—Randall S. Vaas
Attorney, Agent, or Firm—Foley & Lardner, Schwartz, Jeffery, Schwaab, Mack, Blementhal & Evans

[57] ABSTRACT

A security device for use with a telephone handset having a microphone and an ear transducer is disclosed. It is adapted to prevent eavesdropping while the handset is in an on-hook position. The security device is comprised of switching assembly disposed in the handset adapted to disable the transducers. The switching assembly is switched to a first state when the handset is placed within a first predetermined orientation corresponding to a secure mode and is switched to a second state when the handset is placed within a second predetermined orientation corresponding to an operative mode.

26 Claims, 9 Drawing Sheets

SECURITY HANDSET

This is a continuation-in-part of application having U.S. Ser. No. 130,190 filed 8 December, 1987 now U.S. Pat. No. 4,837,819

This invention relates to secure telephone systems but more particularly to a security device for use with a telephone handset to prevent eavesdropping while the handset is in an on-hook position.

One of the requirements of secure telephone systems, is that eavesdropping or bugging of the telephone be prevented when the telephone handset is in an on-hook position.

It was determined that eavesdropping could still be achieved even though the handset is in an on-hook position. The ear and microphone transducers of the telephone handset could be used to pick up and monitor a conversation.

A telephone security device for preventing use of an on-hook telephone for eavesdropping or bugging is disclosed in U.S. Pat. No. 3,715,514 which issued to Alan D. Bell. With this device, a voltage source is connected to the telephone line selector and hook switch through a dialled matrix and sensing relay coil. When the telephone is on-hook (that is with the hook switch open) all conductors from the telephone instrument are short circuited together and are disconnected from the telephone conductors leading out of a private or secure area in which the telephone is located. The short circuiting is accomplished by a plurality of relays responsive to the condition of the sensing relay. When the telephone is off-hook the conductors leading from the telephone are connected to the conductors leading from the area for normal conversational use. A lamp and photoresistor device is provided to isolate the annunciator from external conductors.

The problems associated with this system is that the use of relay coils and a diode matrix in a circuit design results in a relatively bulky and complex device which can be difficult to install and expensive to manufacture.

There is therefore a requirement for a telephone security device which is simple to use, easy to manufacture and which can be readily installed within the handset.

Accordingly, a first object of the present invention is to provide a security device for use with a telephone handset and which is relatively easy to install and inexpensive to manufacture.

Another object of the present invention is to provide a security device able to place the telephone handset in either an operative or secure mode depending on the orientation of the telephone handset.

Yet another object of the present invention is to provide a security device adapted to be placed in a telephone handset and which will short circuit the microphone and ear transducers and disconnect them from the main set when the handset is in the secure mode.

Accordingly, an aspect of the present invention is to provide a security device for use with a telephone handset having a microphone and an ear transducer, adapted to prevent eavesdropping while the handset is in an on-hook position, comprising: first switching means connected across said ear and microphone transducers; and second switching means connected in series with said ear and microphone transducers, such that when said handset is placed within a first predetermined orientation, corresponding to a secure mode, said first switching means becomes closed, shorting said ear and microphone transducers and said second switching means becomes open, and when said handset is placed within a second predetermined orientation, corresponding to an operating mode, said first switching means becomes open to enable said ear and microphone transducers, and said second switching means becomes closed.

Particular embodiments of the invention will be understood in conjunction with the accompanying drawings in which.

Figure 1:
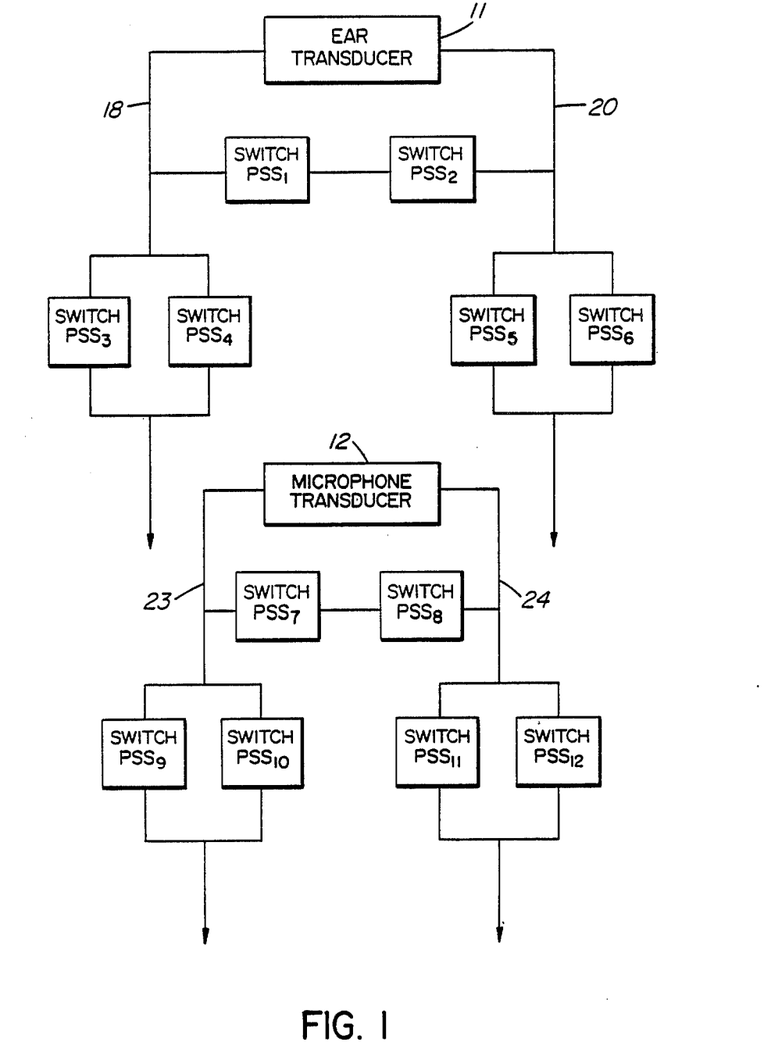
FIG. 1 is a block diagram of the security device according to the preferred embodiment of the present invention.

Referring now to FIG. 1, we have shown a block diagram of the security device according to the present invention.

The security device is basically comprised of a number of position-sensing switches adapted to be disposed in a telephone handset (not shown). Depending on the orientation of the handset, the telephone is either in a secure mode or in an operative mode. As shown in FIG. 1, these position-sensing switches are connected to the ear transducer 11 and microphone transducer 12 forming part of a telephone handset (not shown).

A first pair of position sensing switches $PSS_1$ and $PSS_2$ is connected across ear transducer 11. A second pair of position sensing switches $PSS_7$ and $PSS_8$ is connected across microphone transducer 12. Each pair is so disposed in the handset, as will be described further, such that each switch is closed when the handset is within the first range of predetermined orientations, corresponding to the secure mode whereas at least one switch in each pair is open when the handset is within a second range of predetermined orientations corresponding to the operating mode.

A third pair of position sensing switches $PSS_3$ and $PSS_4$ is connected in series with terminal 18 of ear transducer. A fourth pair of position sensing switches $PSS_5$ and $PSS_6$ is connected in series with terminal 20 of ear transducer 11.

A fifth pair $PSS_9$ and $PSS_{10}$ is connected in series with terminal 23 of microphone transducer 12 and a sixth pair $PSS_{11}$ and $PSS_{12}$ is connected in series with terminal 24 of microphone transducer 12.

The third, fourth, fifth and sixth pair of position sensing switches are so disposed in the handset such that each switch is open when the handset is within the first range of predetermined orientations corresponding to the secure mode whereas at least one switch in each pair is closed when the handset is within the second range of predetermined orientation corresponding to the operating mode.

Figure 2A:
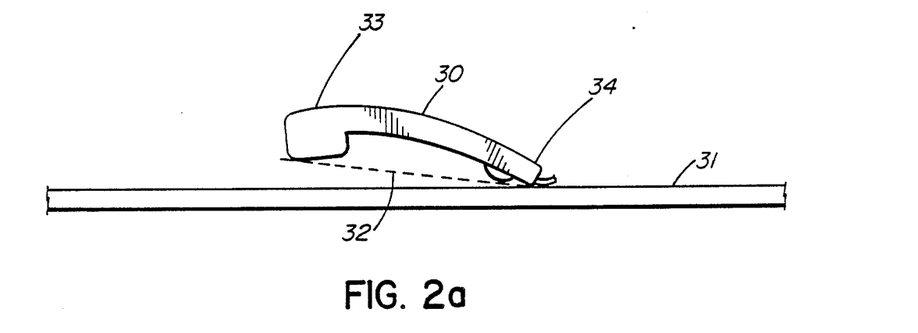
FIGS. 2a to 2c illustrate the operational range of the security device when the telephone handset is in the secure mode.
Figure 2B:
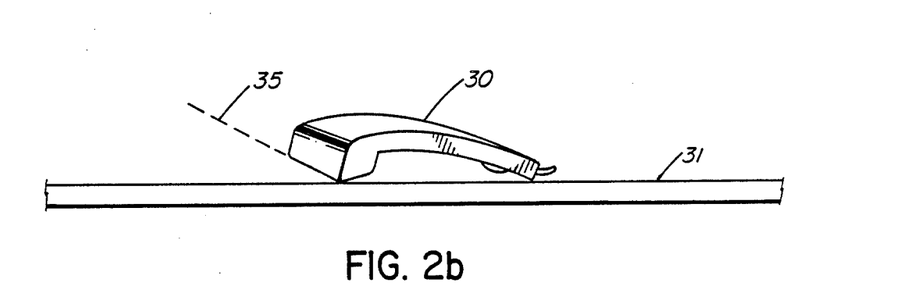
Figure 2C:
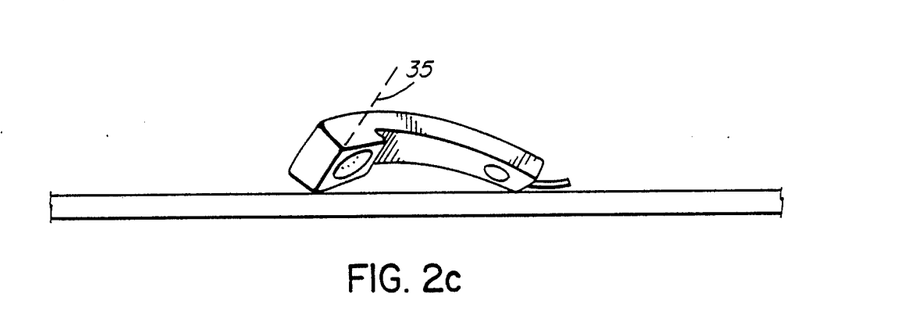

Referring now to FIGS. 2a to 2c, we have shown three series of movements which allow the secure device of the handset to change from a secure mode to an operating mode. The handset 30 is in a secure mode when the angle the longitudinal axis of the handset makes with the horizontal plane extends between 0 and a first predetermined angle. In FIG. 2a, the longitudinal axis of the handset is defined by a phantom line 32 which extends between the ear and microphone ends 33 and 34 respectively, of the handset 30. The horizontal plane is defined by line 31. Beyond this first predetermined angle, the handset should change from a secure mode to an operative mode.

Similarly, as shown in FIGS. 2b and 2c, the handset is within the first range of predetermined orientations corresponding to a secure mode, when the angle the lateral axis of the handset makes with the horizontal plane extends between 0 and a second predetermined angle. The lateral axis of handset 30 is defined by a line extending perpendicular to the longitudinal axis and parallel to the horizontal plane. In FIG. 2b and 2c this lateral axis is illustrated at reference numeral 35. Beyond this second predetermined angle, the handset should change to an operative mode.

Figure 3:
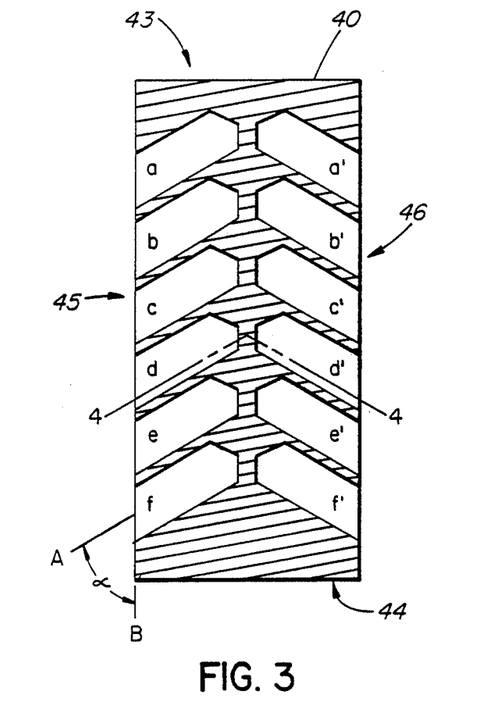
FIG. 3 is a sectional view of the security device mounting block of the present invention, taken along lines 3—3 of FIG. 5.
Figure 4:
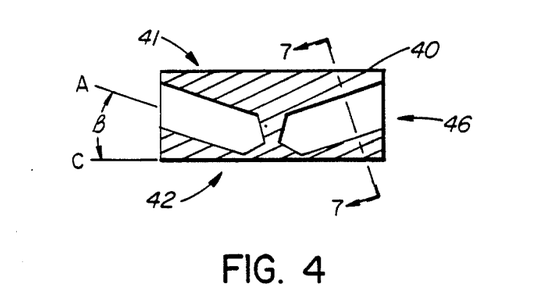
FIG. 4 is a sectional view of the mounting block taken along lines 4—4 of FIG. 5.
Figure 5:
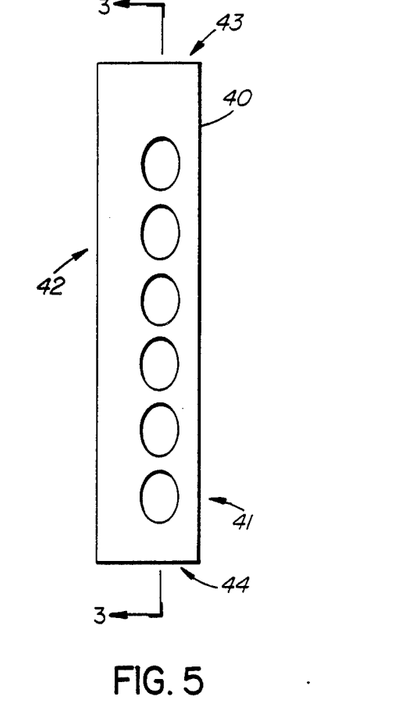
FIG. 5 is a side view of the mounting block.

FIGS. 3 to 5 will be used to describe the position-sensing switch mounting block 40 which is adapted to retain each switch in a predetermined position and orientation. The mounting block is designed to be installed in the handset. The mounting block is generally rectangular and is defined by a top surface 41, a bottom surface 42, a first end 43, a second end 44, a first longitudinal side 45 and a second longitudinal side 46.

The mounting block is adapted to be installed in the telephone handset 30, see FIGS. 2a to 2c, with end 43 pointing towards the ear transducer 33 and end 44 pointing towards the microphone transducer 34. The top surface should face outwardly away from the transducers, i.e. facing the convex side of the handset.

The mounting block is provided with a plurality of receptacles a-f and a'-f' on each of said first and second longitudinal sides 45 and 46. Each is adapted to receive a position-sensing switch in a predetermined arrangement such that, in the secure mode, the first and second pair of position sensing switches will close to short circuit the ear and microphone transducers 11 and 12 respectively. The third, fourth, fifth and sixth pairs of switches will be open to disconnect these transducer from the main set (not shown). In the operating mode, at least one switch of each of the first and second pair will be open to remove the short across the transducers. At least one switch of each of the third, fourth, fifth and sixth pair will be closed to reconnect the transducers to the main set.

The receptacles are each generally tubular in shape and aligned generally along the same axis on each longitudinal side. Each receptacle slopes downwardly and are directed forwardly towards end 43 of block 40. The positionsensing switches are each inserted in a receptacle and interconnected as shown in FIGS. 3 and 4.

Each receptacle has a central axis A which makes an angle a (alpha) with the longitudinal axis B of the mounting block. Similarly, central axis A makes an angle B (Beta) with the lateral axis C of the mounting block.

Figures 6, 7:
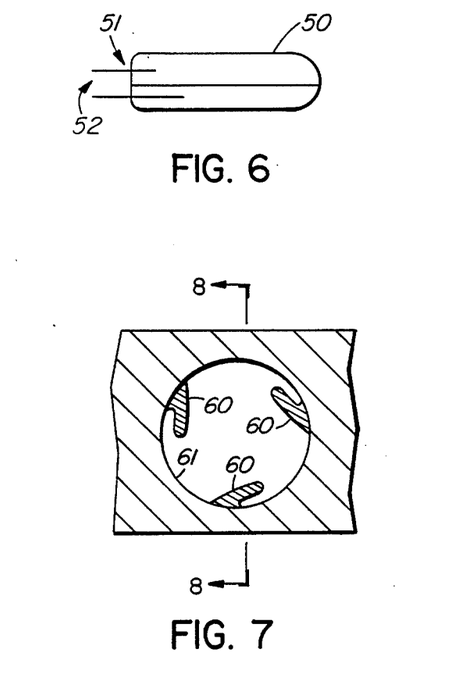
FIG. 6 is an illustrative view of a mercury switch used with the mounting block of FIG. 3.
FIG. 7 is a sectional view of a mercury switch receptacle taken along lines 7—7 of FIG. 4.

The mercury switch 50 of FIG. 6 can be used as a position-sensing switch. In the preferred embodiment, the mercury switch should be provided with contact making terminals at one end. This allows the switch to be positioned in the receptacles so as to be either in the open or closed state.

The switch of FIG. 6 is generally tubular and has a first end 51 with a pair of terminals 52.

The first switch of each pair is inserted in a receptacle on the first longitudinal side of mounting block 40 and the second switch is inserted in a corresponding receptacle on the second longitudinal side of the mounting For example, the position-sensing switches could be inserted in the mounting block receptacles as follows:

| | |
|---|---|
| $PSS_1$ | a |
| $PSS_2$ | a' |
| $PSS_3$ | b |
| $PSS_4$ | b' |
| $PSS_5$ | c |
| $PSS_6$ | c' |
| $PSS_7$ | d |
| $PSS_8$ | d' |
| $PSS_9$ | e |
| $PSS_{10}$ | e' |
| $PSS_{11}$ | f |
| $PSS_{12}$ | f' |

In the secure mode, position-sensing switches $PSS_1$, $PSS_2$, $PSS_7$ and $PSS_8$ should all be closed so as to short circuit the ear and microphone transducers 11 and 12 respectively.

Accordingly, each switch should be inserted in their respective receptacles with their contact making terminals pointing inwardly.

The remaining mercury switches forming each pair of the third, fourth, fifth and sixth pair of mercury switches are inserted in their respective receptacles with their contact making terminals pointing outwardly. These will accordingly be open when the handset is in the first predetermined orientation corresponding to the secure mode.

Accordingly, in operation, when the handset is pivoted about the microphone end of the handset as shown in FIG. 2a, each mercury switch will change state when the handset is moved within a second predetermined range of orientations. For example switches $PSS_1$, $PSS_2$, $PSS_7$ and $PSS_8$ will change from a closed state to an open one. This being caused by the movement of mercury from one end of the bulb where the contact terminals are located to the other end. Similarly, the remaining mercury switches will change from an open state to a closed state where mercury will flow from one end of the bulb to the opposite end where the contact making terminals are located.

Similarly, when the handset is pivoted sideways, as shown in FIGS. 2b and 2c, the mercury switches located closest to the point of rotation will change state. For example, if the mounting block shown in FIGS. 3 and 4 is pivoted about the longitudinal side 46, the mercury switches on that side of the mounting block i.e. those in receptacles a' to f' will change state. Mercury will flow from the end of the switch pointing inwardly to the other end pointing outwardly. Switches $PSS_2$ and $PSS_8$ will change from a closed state to an open state. Switches $PSS_4$, $PSS_6$, $PSS_{10}$ and $PSS_{12}$ will change from an open to a closed state.

With the change of state of switch $PSS_2$ and $PSS_8$, the short across the ear and microphone transducers will be removed. Similarly, with the change of state of switch $PSS_4$, $PSS_6$, $PSS_{10}$ and $PSS_{12}$, the terminals of each transducer will be reconnected.

Similarly, when the mounting block 40 is pivoted sideways about longitudinal side 45, the mercury switches in receptacles a to f will change state.

Referring now to FIG. 7, we have shown a sectional view of a receptacle used for retaining a mercury switch. Each receptacle is provided with a number of flexible ridges 60 secured at one end to the inner wall 61 of the receptacle. Each rib extends longitudinally along the length of the receptacle as can be more clearly shown in FIG. 8.

Figure 8:
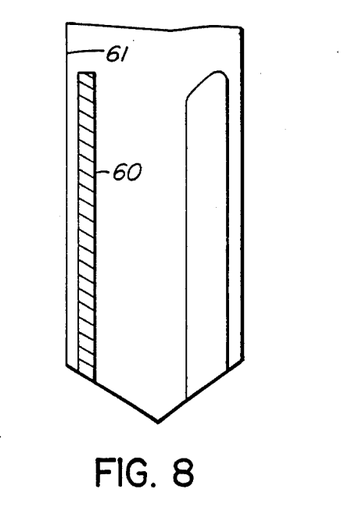
FIG. 8 is a sectional view of the mercury switch receptacle taken along lines 8—8 of FIG. 7.

FIG. 8 is a sectional view of a receptacle taken along line 8—8 of FIG. 7. When a mercury switch is inserted in a receptacle, the ribs 60 will flex to allow the bulb to be removably secured therein. This permits the proper positioning of a mercury bulb.

Figure 9:
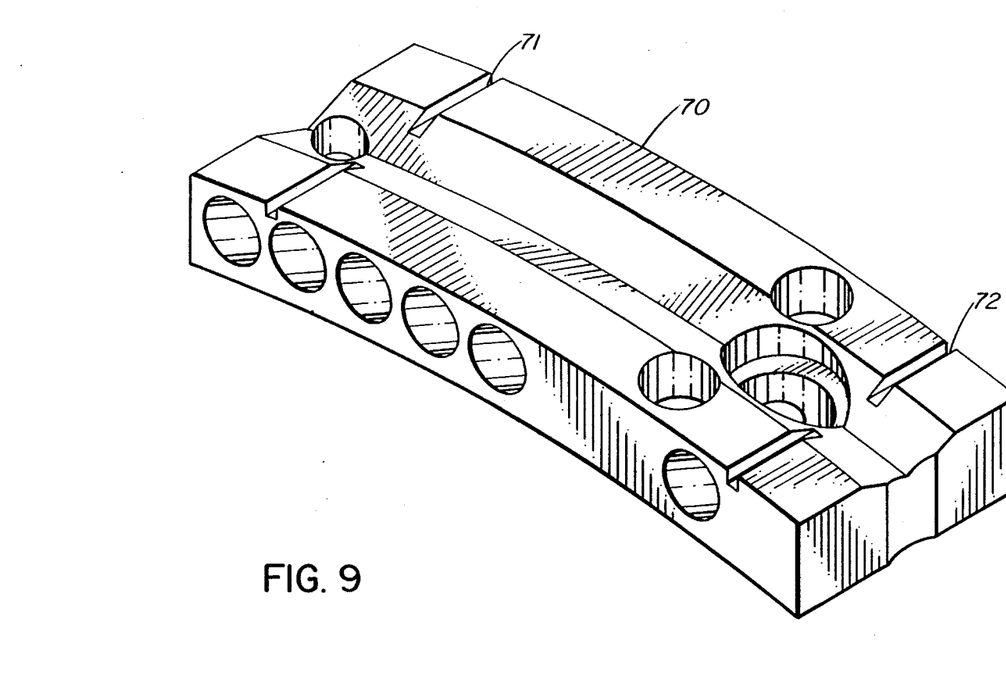
FIG. 9 is a perspective view of a mounting block according to the another embodiment of the present invention.

Referring now to FIG. 9, we have shown a mounting block according to another embodiment of the present invention. The mounting block 70 is designed so as to be used with the MERIDIAN (trademark) type business set. The mounting block is slightly curved along the longitudinal axis in order to allow easy insertion in the handset. In addition, a series of grooves 71 and 72 allows the proper lining of leads running from a first mercury switch to another. In particular, these grooves are used for the leads interconnecting mercury switches $PSS_1$ to $PSS_2$ and switches $PSS_7$ to $PSS_8$.

In the preferred embodiment, the angle, α (alpha) the central axis A makes with the longitudinal axis B of the mounting block is 60°. The angle β (Beta) the central axis A makes with the lateral axis C of the mounting block is 18°.

In the preferred embodiment, the handset will be in the secure mode (all connections from the handset cord to the microphone and ear transducers are open and a short is placed across the ear and microphone transducers) when the handset is laying on a flat table. Lifting the ear end of the handset up while maintaining table contact with the microphone end at any angle less than 9°, the secure mode will be maintained (see FIG. 2a). The operational mode (all transducers connect to the handset card and all shorts removed) occurs in the range of 9° to 52°. The operational mode is maintained at any angle greater than 52°.

Similarly, while holding the left side of the handset on the table and lifting the right side (see FIG. 2b), the secure mode is maintained at angles below 11°. The switch from secure to operational mode will occur in the range of 11° to 37°. The operational mode is maintained at angles greater than 37°. The same angles for switching will apply for lifting the left side of the handset while holding the right side.

Figure 10:
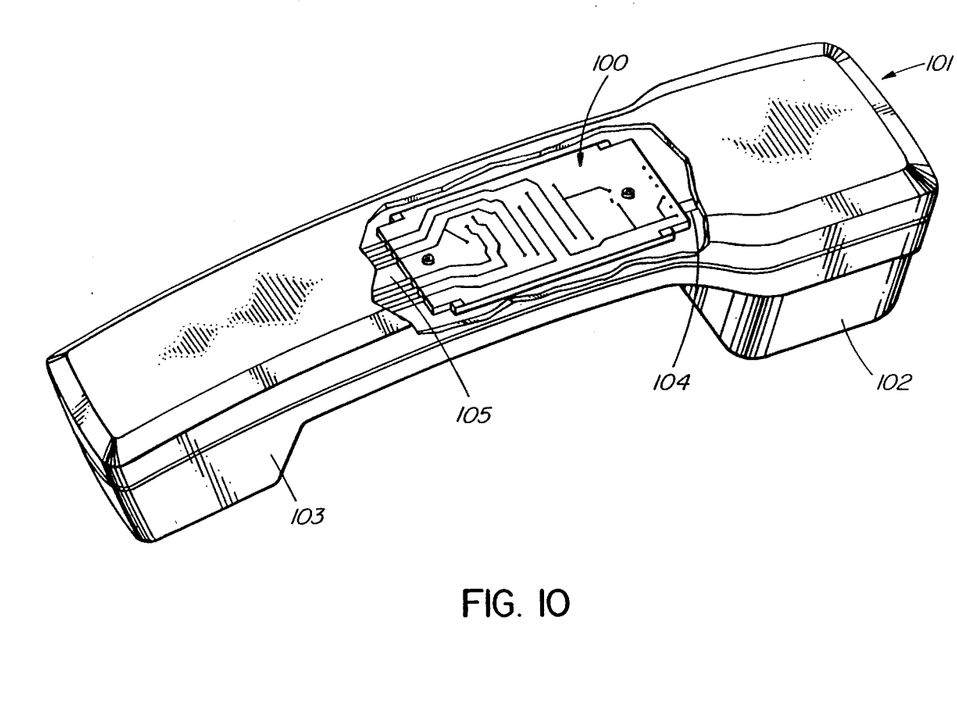
FIG. 10 is a partially sectioned view of a secure handset according to a preferred embodiment of the invention.

Referring now to FIG. 10, we have shown a partially sectioned perspective view of a secure handset according to the preferred embodiment of the present invention. A switching module 100 is disposed in a typical handset 101 between the receiver and transmitter ends 102 and 103 respectively. Electrical leads 104 connect module 100 to the ear transducer (not shown) in receiver end 102. Electrical leads 105 are used to connect module 100 to the microphone transducer and the main telephone set through the telephone cord (not shown). The microphone transducer is located at the transmitter end 103.

Figure 11A:
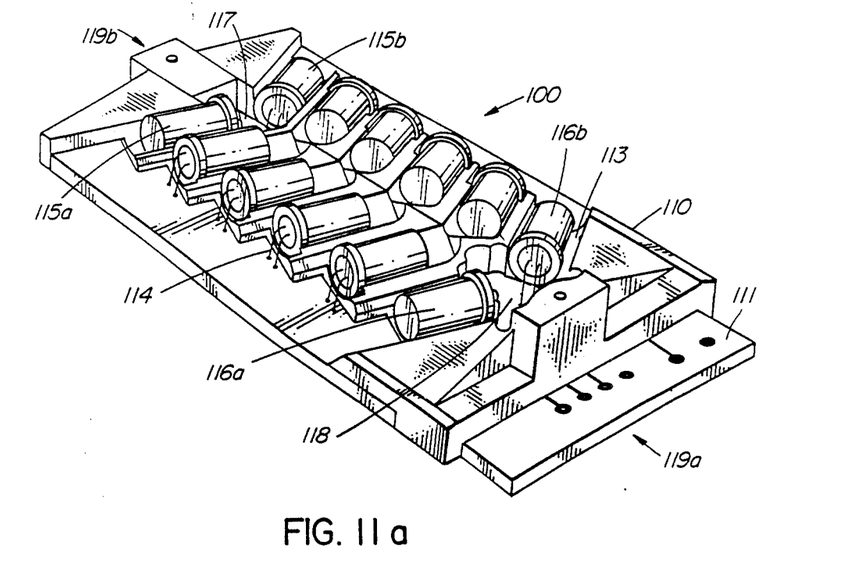
FIGS. 11a and 11b are perspective views of the mercury switch mounting assembly according to the preferred embodiment of the invention.

In FIG. 11a, we have shown a perspective view of the switching module 100. It is basically comprised of switch mounting block 110 disposed on a circuit board 111. The switching module 100 is positioned in the handset has is shown in FIG. 10 with end 119a pointing towards the ear transducer 102 and end 119b pointing towards the microphone transducer 103. The circuit board 111 should face outwardly away from the transducers, i.e. facing the convex side of the handset. Mounting block 110 is comprised of a number of mercury switch receptacles 113 each disposed on an open face of mounting block 110 in a predetermined orientation. This predetermined orientation is similar to that offered by mounting blocks 40 and 70 of FIGS. 3 and 9. That is, the first and last pair of mercury switches 115a, 115b and 116a, 116b have their contact terminals pointing inwardly towards the center of the block whereas the remaining pairs have their contact terminals pointing outwardly. Recess 117 and 118 through mounting block 110 allow the terminals of the first and last pair of mercury switches to reach the printed circuit board 111.

Figure 11B:
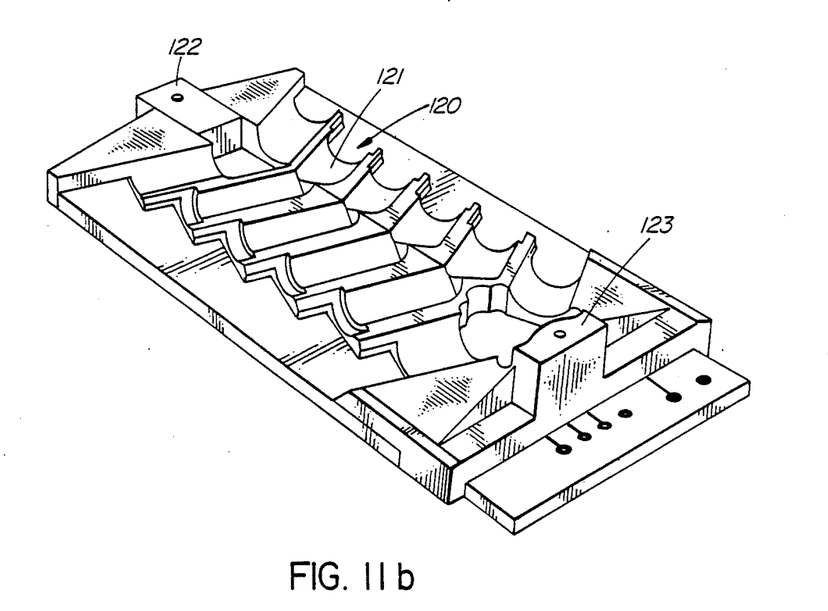

In FIG. 11b, we have shown the switching module without the mercury switches. Each receptacle 120 has a curvilinear cavity 121 which slopes upwardly inwardly. This inclination is similar to that of mounting block 40 shown in FIG. 4, i.e. 18° from an horizontal plane. Similarly, the angle the central axis of each receptacle makes with the longitudinal axis of the mounting block is 60°.

Figure 11C:
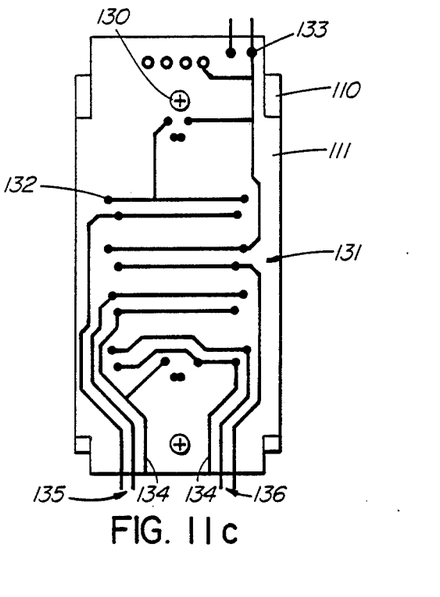
FIG. 11c is a bottom view thereof.

FIG. 11c is a bottom view of the module 100 showing the printed circuit board 111. The mounting block 110 is positioned on a printed circuit board 111 and secured thereto by means of fasteners 130. Board 111 has a circuit pattern 131 formed in a predetermined design to permit contact terminals 114 of each mercury switch to be electrically connected thereto. The terminating points 132 generally located in the central region of board 111 are used for soldering contact terminals of the mercury switches. Terminating points 133 are used to connect the module 100 to the ear transducer whereas terminating points 134 are used to connect the module to the microphone transducer (not shown). Terminating points 135 and 136 connect the module to the main set via the telephone cord(not shown). With the switches soldered in place, the circuit pattern 131 basically represents the block diagram arrangement of FIG. 1.

Figure 11D:
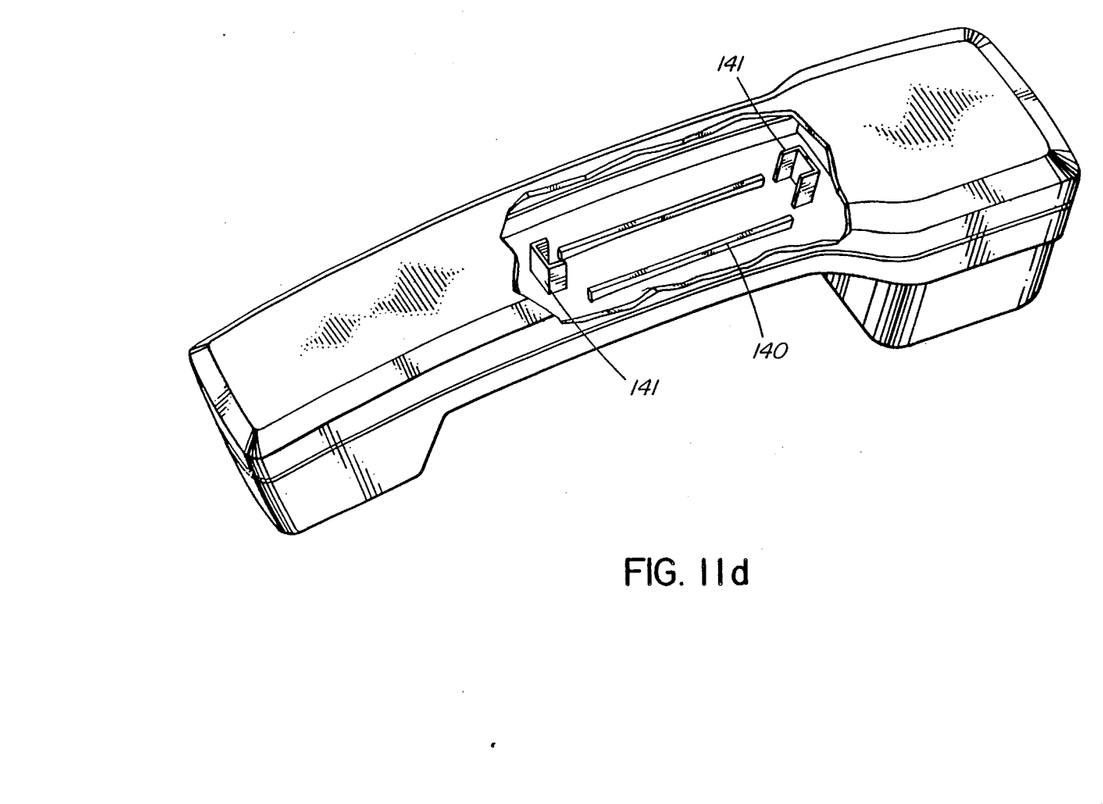
FIG. 11d is a partially sectioned view of the secure handset with the mounting assembly removed therefrom.

FIG. 11d is a partially sectioned view of the support arrangement for the mounting module 100. The support is provided by means of a pair of elongated members 140 positioned longitudinally in said handset and a pair of supporting blocks 141 for retaining module 100 within the handset. The open rectangular shaped supports 141 are adapted to mate with the rectangular shaped protrusions 122 and 123 shown in FIGS. 11a and 11b. This support arrangement will secure the mounting module in the handset while still permitting easy removal and installation.

What is claimed is:

1. A security device for use with a telephone handset having microphone and ear transducers, adapted to prevent eavesdropping while the handset is in an on-hook position, comprising:

first switching means connected across said ear and microphone transducers;

second switching means connected in series with said ear and microphone transducers, such that when said handset is placed within a first predetermined orientation, corresponding to a secure mode, said first switching means becomes closed, shorting said ear and microphone transducers and said second switching means becomes open, and when said handset is placed within a second predetermined orientation, corresponding to an operating mode, said first switching means becomes open to enable said ear and microphone transducers, and said second switching means becomes closed; and a mounting assembly for said first and second switching means comprised of a mounting block disposed on a circuit board.

2. A security device as defined in claim 1 wherein said handset is within said first predetermined orientation, corresponding to a secure mode, when the angle the longitudinal axis of said handset makes with a horizontal plane, when pivoted about the microphone end, extends between zero and a first predetermined angle and the angle a lateral axis of the handset makes with the horizontal plane is approximately zero, the longitudinal axis of said handset being defined by a line extending between ear and microphone ends of said handset, the lateral axis of said handset being defined by a line extending perpendicular to the longitudinal axis of the handset and parallel to said horizontal plane when the angle the lateral axis makes with the horizontal plane is zero.

3. A security device as defined in claim 2 wherein said handset is within said second predetermined orientation, corresponding to an operating mode, when the angle the longitudinal axis of said handset makes with said horizontal plane is greater than a second predetermined angle, when pivoted about the microphone end.

4. A security device is defined in claim 3 wherein said handset is further within said first predetermined orientation, corresponding to a secure mode, when the angle the lateral axis of said handset makes with the horizontal plane, extends between zero and a third predetermined angle and the angle the longitudinal axis of the handset makes with the horizontal plane is approximately zero.

5. A security device as defined in claim 4 wherein said handset is further within said second predetermined orientation, corresponding to the operating mode, when the angle the lateral axis of said handset makes with the horizontal plane, is greater than a fourth predetermined angle.

6. A security device as defined in claim 5 wherein said first switching means comprises a first and second set of position-sensing switches, said first set being connected across said microphone transducer and said second set across said ear transducer, each set being so disposed in said handset such that each switch is closed when said handset is in said secure mode and at least one switch of each of said first and second set is open when said handset is in the operating mode.

7. A security device as defined in claim 6 wherein said second switching means comprises a third and fourth set of position-sensing switches, each connected in series with a first and a second terminal, respectively, of said microphone transducer, and a fifth and sixth set of switches, each connected in series with a first and a second terminal, respectively, of said ear transducer, each of said third through sixth sets being so disposed in said handset such that each switch is open when said handset is in said secure mode and at least one switch of each said third, fourth, fifth and sixth set is closed when said handset is in the operating mode.

8. A security device as defined in claim 7 wherein said position-sensing switches comprise mercury switches.

9. A security device as defined in claim 8 wherein each of said mercury switch is generally tubular with contact making terminals at one end thereof.

10. A security device as defined in claim 9 wherein said mounting block has a top, bottom and two ends and is adapted to retain each of said mercury switches in a predetermined position.

11. A security device as defined in claim 10 wherein said mounting block is comprised of a plurality of receptacles, each adapted to receive a mercury switch in a predetermined position such that said first and second set of switches are closed and said third, fourth, fifth and sixth set of switches are open when said handset is in said secure mode and at least one switch of each of said first and second set is open and at least one switch of each of said third, fourth, fifth and sixth set is closed when said handset is in the operating mode.

12. A security device as defined in claim 11 wherein a number of receptacles are positioned along a first longitudinal side of said mounting block and a corresponding number of receptacles are positioned along a second longitudinal side of said mounting block, each longitudinal side being parallel to said longitudinal axis of said handset such that a first end of said mounting block points toward the receiver end of said handset and a second end of said block points toward the microphone end of said handset.

13. A security device as defined in claim 12 wherein each of said first, second, third, fourth, fifth and sixth set is comprised of a pair of mercury switches, a first switch in each pair being positioned in a receptacle along said first longitudinal side of said mounting block, a second switch in said pair of mercury switches being positioned in a corresponding receptacle, along said second longitudinal side of said mounting block, the mercury switches of said first and second set being so mounted in said receptacles such that the contact making terminals thereof point inwardly, downwardly and generally toward said first end and the mercury switches of said third, fourth, fifth and sixth set being so mounted in said receptacles such that the contact making terminals thereof point outwardly, upwardly, and generally away from said first end.

14. A security device as defined in claim 13 wherein said receptacles are generally tubular with a cross-sectional extension larger than the cross-sectional extension of said mercury switches, each receptacle extending in said mounting block from said longitudinal sides, inwardly, forwardly and downwardly towards said first end.

15. A security device as defined in claim 14 wherein said receptacles are further comprised of retaining means adapted to removably secure a mercury switch therein.

16. A security device as defined in claim 15 wherein said retaining means is comprised of flexible ribs extending longitudinally along the length of said receptacles and protruding radially inwardly thereof.

17. A security device as defined in claim 16 wherein said handset is in said secure mode when the angle the longitudinal axis of said handset makes with the horizontal plane is between 0° and approximately 9°.

18. A security device as defined in claim 17 wherein said handset changes from a secure mode to an operational mode when the angle the longitudinal axis of said handset makes with the horizontal plane extends beyond 9°.

19. A security device as defined in claim 18 wherein said handset is in an operating mode when the angle the longitudinal axis of said handset makes with the horizontal plane extends beyond 52°.

20. A security device as defined in claim 19 wherein said handset is in said secure mode when the angle the lateral axis of said handset makes with the horizontal plane is between 0° and approximately 11°.

21. A security device as defined in claim 20 wherein said handset changes from a secure mode to an operational mode when the angle the lateral axis of said handset makes with the horizontal plane extends beyond 11°.

22. A security device as defined in claim 21 wherein said handset is in an operating mode when the angle the lateral axis of said handset makes with the horizontal plane extends beyond 37°.

23. A security device as defined in claim 14 wherein the angle the central axis of said receptacles make with the longitudinal axis of said mounting block is 60°.

24. A security device as defined in claim 23 wherein the angle the central axis of said receptacles make with a lateral axis of said mounting block is 18°.

25. A security device as defined in claim 11, wherein said receptacles are disposed on an open face of said mounting block, each receptacle having an inclined curvilinear cavity for receiving said mercury switches.

26. A security device as defined in claim 1, wherein said circuit board is comprised of a circuit pattern formed in a predetermined design to permit contact terminals of said switching means to be electrically connected thereto in a predetermined orientation.

* * * * *